May 6, 1930.   S. H. IDEUS   1,757,771
MUD SCRAPER
Filed April 13, 1929
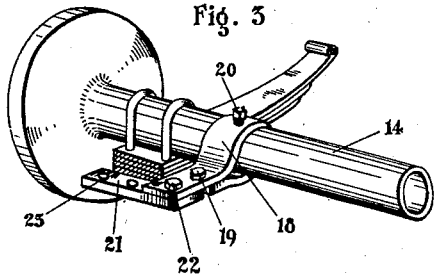
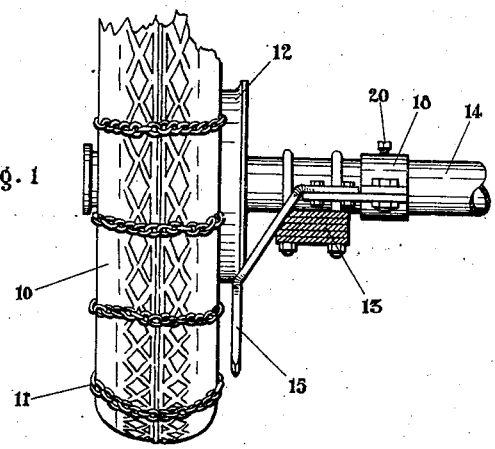
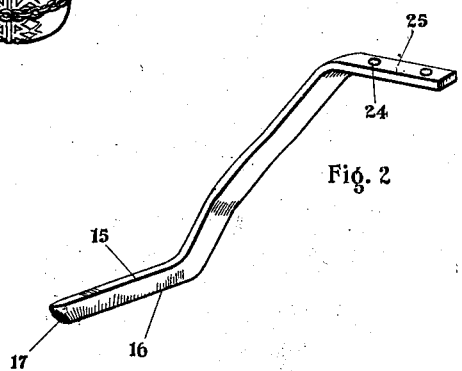
Inventor
Siebend H. Ideus
By Emil F. Lange
Attorney Patented May 6, 1930

1,757,771

UNITED STATES PATENT OFFICE

SIEBEND H. IDEUS, OF BEATRICE, NEBRASKA

MUD SCRAPER

Application filed April 13, 1929. Serial No. 354,874.

My invention relates to mud scrapers for automobile wheels, its primary object being the provision of a scraper member which may be attached to an automobile so as to scrape off the mud which accumulates on the wheel during driving.

Another of my objects is to provide a knife having a knife edge and a chisel end which may be so positioned that it will loosen the mud on the wheel even though the mud is packed hard.

Another of my objects is the provision of an adjustable feature whereby the knife may be moved toward or away from the wheel to position it where it will accomplish its purpose most effectively.

Another of my objects is the provision of a mud scraper attachment for automobiles which may be so positioned that it will not interfere with the brakes or springs of the automobile nor with the tire chains when the tire chains are in place.

Having in view these objects and others which will be pointed out in the following description, I will now refer to the drawings, in which Figure 1 is a view in elevation of a portion of the axle of an automobile and of an automobile wheel, showing my entire device secured thereto.

Figure 2 is a view in perspective of the scraping knife only.

Figure 3 is a view in perspective of a portion of the automobile axle with the clamp and support of my device secured thereto.

In the drawings the automobile wheel is designated by the numeral 10 and the tire chain by the numeral 11. The brake drum is shown at 12 and the automobile spring is shown at 13. The wheel 10 with its brake drum 12 is secured to the axle 14 which may be either a front axle or a rear axle.

The scraping knife shown in Figure 2 has a knife portion 15 which is parallel with the plane of the wheel as shown in Figure 1. The knife 15 has a beveled cutting edge at 16 and its free end 17 has a chisel bevel. As long as this knife 15 is held rigidly in the position shown in Figure 1, it will shave off the mud from the wheel 10 during the travel of the wheel.

To hold the scraper knife 15 rigidly I provide a clamp 18 adapted to surround the axle as shown in Figure 3. This clamp is preferably made in looped form from a metal strap and the end on the other side is secured to the rearwardly projecting portion of the loop by means of the bolt 19. This bolt may be tightened or loosened for releasing the clamp or for altering its position on the axle 14. The bolt 19 tends to hold the clamp 18 in place on the axle but additional holding means are provided in the form of a set screw 20 which bears directly against the axle 14 and which effectively prevents any accidental displacement of the clamp 18. To the rearwardly projecting portion of the clamp 18 I secure a support 21 by means of a bolt 22, the support 21 projecting horizontally toward the wheel. The support 21 is provided with a pair of apertures 23 which correspond with apertures 24 in the horizontal portion 25 of the scraper knife. The horizontal portion 25 of the scraper knife is rigidly secured by passing bolts through the apertures 23 and 24 in the manner indicated in Figure 1.

Unimproved roads are frequently so soft with sticky clay that the clay is apt to accumulate in great masses on the tires. This is particularly true when the chains are in place and the chains are usually in place when the clay is slippery. The accumulation of the mud is such that it very often stalls the motor even in low gear. The customary procedure in such cases is for the driver or one of the passengers to get out into the mud and to pick out the mud from between the spokes of the wheels, using a stick or any other handy tool. When a sufficient amount of this mud has been removed, the automobile may travel under difficulties until the remainder of the mud on the wheel is thrown off during the movement of the automobile. This is very hard on the motor and on the brakes and springs of the car. With my invention the mud is constantly shaved and thrown off and is never allowed to accumulate.

Having thus described my invention in such full, clear, and exact terms that its construction and operation will be readily understood by others skilled in the art to which it pertains, what I claim as new and desire to secure by Letters Patent of the United States is:

A mud scraper for an automobile wheel including a blade positioned in parallelism with the plane of the automobile wheel, said blade having a forwardly and inwardly inclined shank and terminating in a horizontal portion adjacent the wheel axle and parallel thereto, a collar adapted to surround the wheel axle and adjustably slidable thereon, a connection between said collar and the horizontal portion of said shank, and a set screw for securing said collar in adjusted position on the wheel axle.

In testimony whereof I affix my signature.

SIEBEND H. IDEUS.